United States Patent [19]

McGregor

[11] 4,299,277
[45] Nov. 10, 1981

[54] HEATING AND COOLING SYSTEM EMPLOYING REMOTE BURIED STORAGE AREAS

[75] Inventor: James M. McGregor, Lake Dallas, Tex.

[73] Assignee: Climate Cycling Corporation, Fort Worth, Tex.

[21] Appl. No.: 58,800

[22] Filed: Jul. 19, 1979

[51] Int. Cl.³ ................... F25B 29/00; F28D 13/00
[52] U.S. Cl. ................... 165/48 S; 165/45; 165/104.15; 165/104.31; 62/260; 126/436
[58] Field of Search ............. 165/18, 45, 48 S, 104 S, 165/50, 48; 62/2, 260; 126/430, 436, 400, 428

[56] References Cited

U.S. PATENT DOCUMENTS

| | | | |
|---|---|---|---|
| 3,262,493 | 7/1966 | Hervey | 165/45 X |
| 3,276,516 | 10/1966 | Japhet | 165/62 X |
| 3,527,921 | 9/1970 | Voglesonger | 165/18 X |
| 3,965,972 | 6/1976 | Petersen | 165/45 |
| 3,983,929 | 10/1976 | Thomason et al. | 165/18 |
| 4,054,246 | 10/1977 | Johnson | 126/400 X |
| 4,062,489 | 12/1977 | Henderson | 165/18 X |
| 4,069,973 | 1/1978 | Edwards | 126/430 X |
| 4,111,360 | 9/1978 | Barr | 126/430 X |
| 4,210,201 | 7/1980 | O'Hanlon | 165/104 S |
| 4,219,074 | 8/1980 | Hansen | 165/45 |

FOREIGN PATENT DOCUMENTS 2605953 8/1977 Fed. Rep. of Germany ........ 165/45

*Primary Examiner*—Samuel Scott
*Assistant Examiner*—Margaret A. Focarino
*Attorney, Agent, or Firm*—James C. Fails

[57] ABSTRACT

An improvement in an environment heating and cooling system in which air is circulated in heat exchange relationship with a first heat exchanger and the enclosed space to be air conditioned characterized by hot and cold heat exchangers at the surface connected in respective heating and cooling fluid circuits with, respectively, remote buried heat and cold storage areas; with respective pump means for pumping in both directions through the respective heat and cold storage areas for putting either heat or cold into the storage areas and removing therefrom, heat or cooling capacity. Also disclosed are preferred embodiments, piping interconnections and the like, including an embodiment in which a supplemental mechanical refrigeration unit is employed for use during time of bargain electrical rates to store excess cooling capacity in the cold storage area.

9 Claims, 6 Drawing Figures

HEATING AND COOLING SYSTEM EMPLOYING REMOTE BURIED STORAGE AREAS

FIELD OF THE INVENTION

This invention relates to an environmental system for heating and cooling an enclosed space in which heat or cold is stored in substantial quantities in remote storage areas over a relatively long period of time and the capacity for heating or cooling is removed from these respective hot and cold storage areas as needed, depending upon when the heating and cooling mode is employed.

DESCRIPTION OF THE PRIOR ART

The rising cost and short supply of fossil fuels has stimulated interest in alternate sources of energy for space heating and cooling. One of such sources is the use of solar energy for heating. Embodiments employing solar heating were employed well before this century. The intermittent nature of solar radiation, however, requires a method of storing the heat energy derived from the sun for use during such intermittent periods when the sun is not shining. With the recent emphasis on the use of solar heat; in particular, problems associated with storing such heat for use at a later time; difficulties have become more apparent. The high cost of construction of storage devices has minimized the effectiveness and usefulness of solar heat. Likewise, storage of heat from any source has been a problem.

Similarly and conversely, the storage of "cold", or negative heat, has been a problem.

In general, large volumes of storage media are essential and at times the cost of providing the storage has proved to be a limiting factor. There are a host of patents describing solutions to this problem. Typical are the following U.S. Patents: U.S. Pat. No. 2,529,154 describes a heating system employing a heat pump to operate on ground heating during cold weather. A solar heating system using an underground tank is shown in U.S. Pat. No. 2,553,302. U.S. Pat. No. 2,584,573 shows a system of underground pipes and lines to store heat. U.S. Pat. No. 2,594,232 shows a solar heater and heat exchanger with conduit and fins 92 that can be bent into a desired shape. U.S. Pat. No. 2,680,565 shows the use of rock as a storage medium. U.S. Pat. No. 2,689,090 shows a heating system employing heat pump with supplemental heating means and buried heat exchangers, employing an atmospheric heat absorber.

U.S. Pat. No. 3,262,493 shows the use of in-ground storage where the ground itself is used for heat and cold storage where ducts are buried directly in the ground. U.S. Pat. No. 3,298,156 shows multilevel subsurface with a network of pipes and concrete enable building on snow and ice using concrete slabs and the like. U.S. Pat. No. 3,339,629 shows a system of underground pipes and lines to store heat. U.S. Pat. No. 3,369,541 and 3,412,728, employ solid heat storage media. U.S. Pat. No. 3,931,851 employes liquid aquifers to enable storing heat in a source and removing heat from a sink. U.S. Pat. No. 3,965,973 shows a heating and cooling system employing deep cisterns for the respective storage volumes. U.S. Pat. No. 3,978,627 shows a burial facility. U.S. Pat. No. 4,004,574 shows solar energy with a sun follower and subsurface storage. U.S. Pat. No. 4,008,709 shows and underground storage system for heating and cooling employing energy storage tanks. U.S. Pat. No. 4,010,731 shows energy storage tank for hot and cold. U.S. Pat. No. 4,024,910 shows hot and cold storage system using a plurality of channels filled with rocks. U.S. Pat. No. 4,042,012 shows a heat pump system employing hydrophilic polymeric gel particles soaked with water around the pipe carrying the heat into underground storage.

All of the foregoing systems had the disadvantages of being very expensive in installation, requiring special naturally occuring aquifers or the like, or were ineffective in transferring the heat or "cold" from the remote heat storage area or cold storage area, respectively, or had inadequate capacity for heat and "cold".

SUMMARY OF THE INVENTION

Accordingly, it is an object of this invention to provide an environmental heating and cooling system that is economical, has adequate capacity, has efficient means for transferring heat into and out of the respective storage area and otherwise alleviates the deficiencies of the prior art.

It is also an object of this invention to provide an environmental system having a simple, durable and efficient heat storage area requiring a minimum of space within the structure, or enclosed space to be air conditioned, utilizing available energy such as solar energy to store heat and utilizing cold winter air to store "cold"; such that the respective storage areas can be employed alone or in conjunction with supplemental heating or cooling means, while alleviating the problems of the prior art.

These and other objects will become apparent when taken in conjunction with the following descriptive matter, particularly the appended drawings.

In accordance with this invention there is provided an environmental system for conditioning air being circulated in a building or the like and including the usual air distribution system, air circulation means and heat exchanger for exchanging heat with the air conditioning air, the system being characterized by improvement for heat exchanging with ambient sources and storing heat and cold for later use and further comprising respective heat and cold storage areas and fluid circuits, each of the fluid circuits having a respective heat exchanger for extracting heat or giving heat to an ambient heat source or sink, a buried heat or cold storage area and volume, respective pump means for circulating the respective heating and cooling to the respective heat and cold storage areas and respective pump means for pumping the respective heating and cooling fluids from the respective heat and cold storage area for operating in the heating mode and for operating in the cooling mode. Preferably, respective interconnecting conduits allow flowing individually and separately the cooling fluid and the heating fluid into the heat exchanger for flowing in heat exchange relationship with the air conditioning air at any time.

In a preferred embodiment, a solar collector is employed for converting the solar energy into heat that can be stored in the heat storage area.

In another embodiment, a supplemental mechanical refrigeration unit is operated; for example, during off peak times so as to take advantage of bargain rates for electricity; and store "cold" for later use in the cooling mode.

BRIEF DESCRIPTION OF DRAWINGS

FIG. 1b is a block diagram showing schematically, the elements of FIG. 1a.

FIG. 5 is a schematic drawing of the piping and other elements of the system of FIG. 1a.

DESCRIPTION OF THE PREFERRED EMBODIMENTS

Figure 1A:
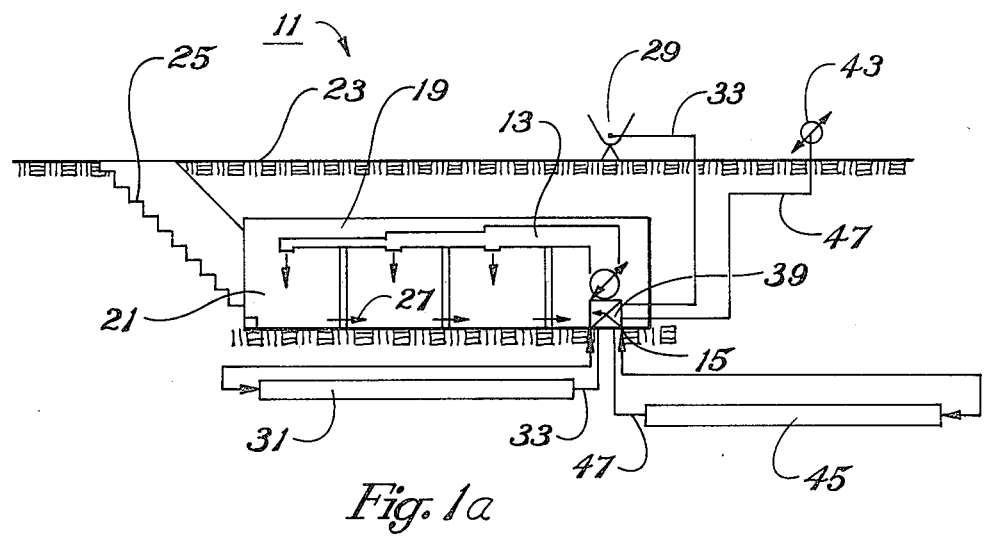
FIG. 1a is a partial sectional view, partly schematic, showing one embodiment of this invention.
Figure 1B:
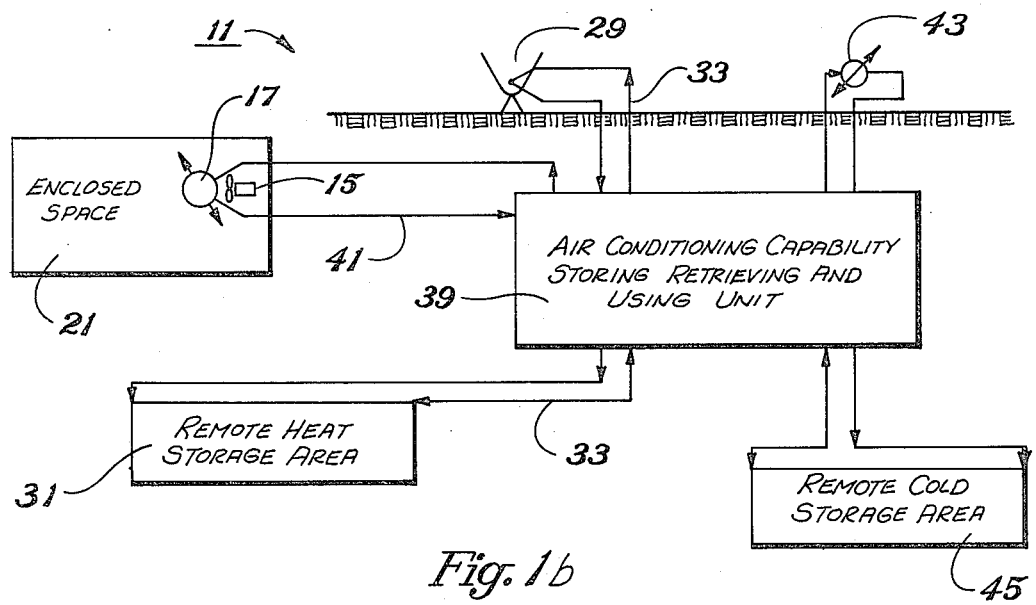
Figure 2:
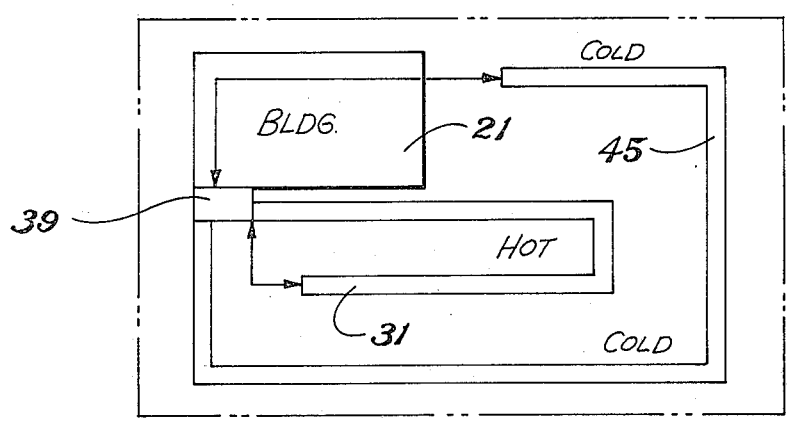
FIG. 2 is a planned view of one embodiment of this invention having the elongate hot and cold storage areas.

Referring to the Figures and particularly to FIGS. 1a, 1b, 2, and 5, the apparatus 11 for conditioning air being circulated in an enclosed space includes the following respective items. An air distribution system 13 includes an air circulation means 15 for circulating the air and a heat exchanger 17 for exchanging heat between the air and a heat exchange fluid.

The air distribution system 13 may comprise a plurality of plenums and ducts for conducting the air into the various rooms 19 of the building 21 or the like. The enclosed space may be other than a building although ordinarily a building will serve to illustrate the type of enclosed space that will be air conditioned. As illustrated the building 21 is subterranean; that is, below the surface 23 of the earth and has stairways 25 leading down into the building. This serves to further conserve the energy required for air conditioning the building 21, since it reduces heat exchange with the ambient above the surface of the earth. If desired, as shown by the arrows 27, the air may return through louvers in the doors or the like to the air circulating means 15.

The air circulating means 15 circulates the return unairconditioned air past the heat exchanger 17 and flows it out again through the air distribution system 13. The air circulation means may take any of the forms conventionally employed. Typically it will be a powered squirrel cage blower for relatively higher positive discharge pressures than are obtainable with a fan or the like. It will be apparent, of course, that a fan may be employed where the distribution system is a simplified one without an elongate system of ducts, plenums or the like. The air circulation means must have sufficient power, however, to circulate the air past the heat exchangers 17.

The heat exchanger 17 is an air-fluid heat exchanger for circulating the air in heat exchange relationship with another fluid to air condition the air. The heat exchanger 17 will ordinarily comprise heat conductive coils, such as copper coils with fins or the like to increase the heat transfer. It is interposed in the air distribution system such that the air is flowed in heat exchange communication therewith.

Figure 5:
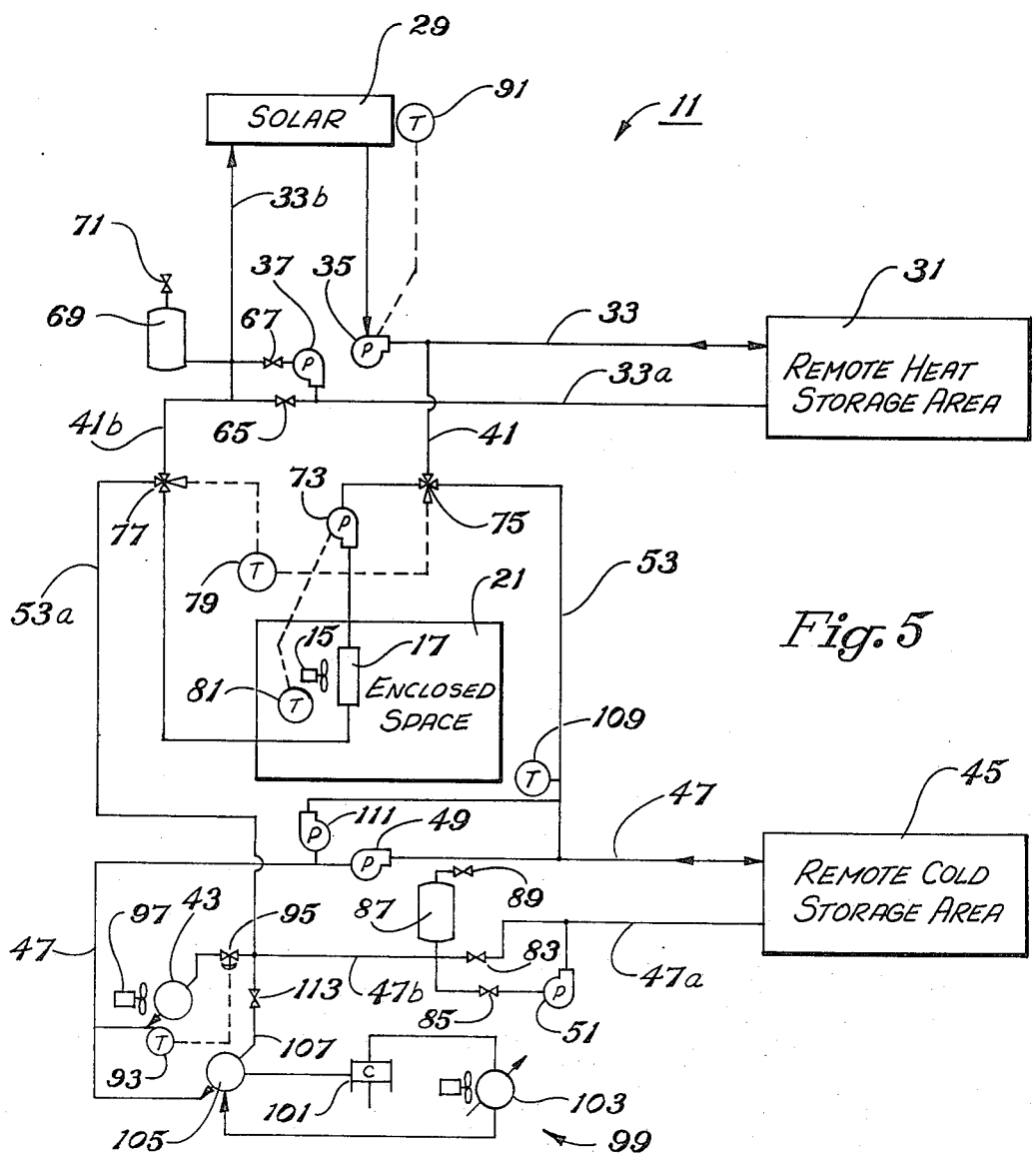

The improvement for heat exchanging with ambient sources and making this invention advantageous over the prior art lies primarily in the following elements of the assembly 11. A second heating heat exchanger 29 is provided for extracting heat from an ambient heat source such as the sun's radiant energy. A remote heat storage area 31 is buried beneath the earth's surface. A heating fluid circuit 33 is provided for flowing the heated fluid through the second heat exchanger 29 and the remote heat storage area 31 for storing the heat from the solar radiation. Respective first and second heating pumps 35 and 37, FIG. 5 are provided in the air conditioning capability storing, retrieving and using unit 39, FIG. 1b, for pumping the heating fluid into and out of the remote heat storage area. An air heating circuit 41 is provided for flowing the heating fluid through the first air heat exchanger 17.

The system or apparatus 11 also includes capability of storing the "cold", or negative heat, or "capacity to do cooling" and includes the following elements. A third cooling heat exchanger 43 is provided for venting heat to an ambient source, such as cold winter air for cooling a cooling fluid. A remote cold storage area 45 is buried beneath the earth's surface at a spaced apart location from the remote heat storage area 31. A cooling fluid circuit 47 is provided for flowing a cooling fluid through the third heat exchanger 43 and the cold storage area 45. A cooling fluid is in the cooling fluid circuit. Respective third and fourth cooling pump means 49 and 51 are provided for circulating the cooling fluid into and out of the cold storage area 45. An air cooling circuit 53 is provided for cooling the air being circulated in the enclosed space 21.

The second heating heat exchanger 29 may comprise any of the type heat exchangers for extracting heat from an ambient source. Obviously, if the ambient source is a heated fluid, such as geothermal fluid, waste hot fluid from an adjoining process or the like it will be a fluid-fluid type heat exchanger. As illustrated, however, the second heating heat exchanger is a solar collector. The solar collector may be of the planar type although it is preferably of the magnifying type. The magnifying type may be in the form of parabolic reflectors or may employ Fresnel lenses to concentrate the sunlight from a larger area into a single conduit or the like at the focal point of the solar rays. Preferably, the magnifying type is employed because higher temperatures are achievable to facilitate storing heat in the remote heat storage area 31.

Figure 3:
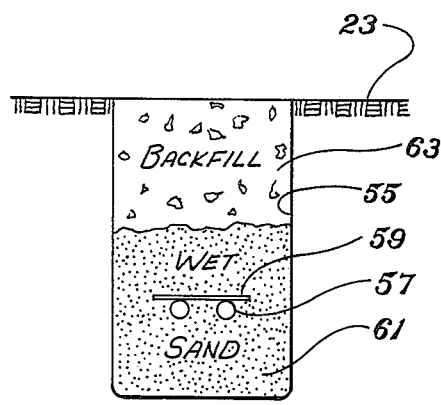
FIG. 3 is a cross sectional view of a typical trench employed in the respective hot and cold storage areas.

Remote heat storage area 31 is an elongate trench of suitable depth and similar to the trench 55, FIG. 3, in which are placed heat conductive conduits similar to the conduit 57 for the heat exchange fluid. As illustrated, a plurality, such as a pair, of conduits 57 are connected in parallel so that the heating fluid flows in one end and flows out the opposite end for storing heat. Also as illustrated, the pair of conduits 57 are held contiguous, as by welding, brazing, silver soldering or the like, with a heat conductive plate 59 to increase the heat transfer area. The trench 55 is partially filled with wet sand 61 before the pipes and plate 57, 59 are placed thereinto. An additional layer of wet sand is emplaced over the pipes and plate 57 and 59. The remainder of the trench is then filled with backfill materials 63 for insulating it from the effects of the ambient atmosphere at the surface 23. Backfill material may take the form of the dirt that was removed from the trench originally or it may be diluted with insulating material to increase the insulating qualities. Ordinarily, it is more economical to simply backfill with the soil that has been removed from the trench. The remote heat storage area 31, and specifically, the conduits 57, are buried beneath the surface 23 by depth of more than six feet, preferably about eight feet. The trench is elongate and in one embodiment found satisfactory was about six hundred and eighty feet in length. The pipes 57 are of appropriate diameter for the volume of fluid being circulated. For example, an inch and one-half copper conduit has been found to be satisfactory for the pipes 57. The plate 59 is also preferably of copper, although other heat conductive materials can be employed. Care has to be taken to employ corrosion resistance material in the wet sand to prevent corrosion becoming a problem. The respective conduits 57 are connected together at each of their respective ends into a common header that is connected with the respective pumps 35 and 37. The respective pipes connecting the headers with the pumps 35 and 37 form the heating fluid circuit 33. The pipes, or conduits of the heating fluid circuit 33 may be formed of any material; although, preferably, corrosion resistance material, such as plastic or copper, is employed. The plastic pipe, if it is employed, must be able to withstand the heat of the heating fluid.

The respective first and second heating pumps 35 and 37 may be of any form of pumps. As illustrated, they are centrifugal pumps to facilitate even flow with even pressure gradient and with low power consumption. Only one of the pumps will be employed at a time, depending on the direction of flow. Bypass valves 65, 67 are employed to allow flow for the respective pumps in a respective direction while isolating portions of the circuit during other directions of flow. A surge tank 69 is employed to insure that the positive charge is maintained on the piping system making up the heating fluid circuit and allow bleeding off by way of valve 71 any air or insoluble gases that tend to accumulate.

The heating fluid that is employed in the heating fluid circuit and circulated by the first and second pumps may comprise any of the conventional fluids. Ordinarily, aqueous fluids are preferred because of their relatively high heat capacity and good heat transfer characteristics. Particularly, the aqueous fluids containing antifreeze material, such as, ethylene glycol, diethylene glycol, triethylene glycol or even methyl alcohol can be employed to resist freezing yet enable readily transferring heat into or out of the remote heat storage area 31.

The air heating circuit 41 includes respective conduits connected with the air heat exchanger 17 for air conditioning the enclosed space 21, as well as suitable controls. If the pumps are sized to circulate the respective heat exchange fluids, such as the heating fluid, through the heat exchanger 17, larger pumps are required. Consequently, a supplemental pump 73 is interposed in the heating fluid circuit 41 for circulating fluid through the heat exchanger 17. This allows operation of the heat exchanger 17 independently of the pump 35. As illustrated, three way valves 75, 77, FIG. 5, are provided for routing the heating fluid through the pump 73 and the air heat exchanger 17. The three way valve 75, 77 are connected with a thermostat 79 that controls whether the unit is operating in the heating mode or the cooling mode. Any other suitable arrangement of controls can be employed as desired. The pump 73 and the air circulating means 15 are connected with a thermostat 81 interiorly of the enclosed space to control when the air is flowed in heat exchange relationship with the heat exchange fluid in the air heat exchanger 17.

Manual options are afforded for over-riding the thermostat 79 and 81 by the occupants of the enclosed space 21 such that heating or cooling of the air can be effected regardless of the outside temperature or the inside temperature.

The respective conduits used in the respective fluid circuits, such as the heating fluid circuit, the air heating circuit means and the air cooling circuit, may be any of those ordinarily employed for circulating the fluids in use. Frequently where aqueous fluids are circulated, copper or plastic conduits are employed, along with appropriate types of fittings such as elbows, couplings and the like to prevent setting up galvanic cell. Expressed otherwise, the usual plumbing practices are employed in this invention so that no exotic new procedures or conduits are necessary.

When operating in the cooling mode, the other subsystem employing the cooling fluid is used. As indicated, this includes the third cooling heat exchanger 43. The third cooling heat exchanger 43 may be any of the heat exchangers appropriate to exchange heat with the ambient cold fluid. As illustrated, the heat exchanger 43 is an air heat exchanger in which the cold winter air is blown past the heat exchanger, such as finned tubes through which the cooling fluid is circulated to give up heat to the cold winter air or the like. Thus heat is taken from the cold storage area to effectively store "cold", or negative heat. The cold storage area 45 comprises an elongate trench similar to that illustrated in FIG. 3 and described hereinbefore with respect to the heat storage area 31. The same size conduits, the contiguous conduits and plates 57 and 59 are embedded in wet sand in the trench 55 and covered with backfill 63. As described with respect to the heat storage area, the conduits and plate 57 and 59 for the cold storage area 45 are also at least six feet below the surface 23. Preferably they are even deeper than the heat storage area. For example, where the heat storage area was about eight feet or so, it is preferable to employ more than ten feet, for example about sixteen feet depth for the cold storage area conduits and plate 57, 59. Of course, such depth makes more difficult digging of the trench with a backhoe or the like. Accordingly, the reach of the backhoe may be controlling in the depth of the trench 55.

The cooling fluid circuit 47, is constructed similarly as was the heating fluid circuit 33 and consists of the appropriate piping, fitting, valves and the like for transfering heat into or from the cold storage area depending upon whether or not the cooling mode of operation is employed in the enclosed space 21.

The third and fourth cooling pumps 49, 51 are similar to the heating pumps 35 and 37 and are employed for pumping the cooling fluid into and from the remote cold storage area 45. Two-way valves 83, 85 are connected into the circuit so as to allow pumping of the cooling fluid into or out of the cold storage area depending upon whether the pump 49 or pump 51 is being employed. Obviously, only one of the pumps 49 and 51 will be employed at a time. A surge tank 87 serves as an accumulator to insure that a positive suction remains on the pumps at all times and allows venting accumulated insoluble gases by way of valve 89.

Figure 4:
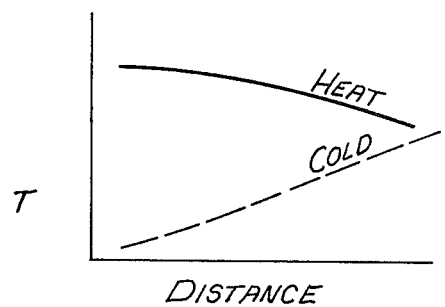
FIG. 4 is a plot of the respective cold and heat storage gradients along the respective conduits through which the heating and cooling fluid are flowed respectively.

In operation, the second heating heat exchanger 29 has its temperature increased, as by the sun's energy. When the temperature is high enough, as detected by thermostat 91, the pump 35 is turned on. The heating fluid, such as the antifreeze solution of triethylene glycol, is circulated by the pipe 33 into the remote heat storage area 31. Return circulation is effected through the return conduit 33a and valve 65 to the solar unit 29, through conduit 33b. As indicated, the surge tank 69 allows bleeding off noncondensibles through valve 71. Thus as can be seen in FIG. 4, the temperature in the remote heat storage area gets progressively higher and approaches more nearly to the temperature registered by the thermostat 91 the closer to the inlet of the heat storage area. As the distance increases along the heat storage area 31 the temperature decreases.

If the heating mode is signalled by the thermostat 79, the three way valves 75 and 77 open to allow the high pressure heating fluid to pass by conduit 41 and pump 73 through the air heat exchanger 17 and back into the circuit through conduit 41b. Thus a portion of the heat may be stored in the remote heat storage area and a portion used to heat the enclosed space 21 if enough heat is being generated at the solar heat exchanger 29.

If inadequate heat is being generated to warrant operating of the pump 35, the pump 73 may circulate the heating fluid through the solar heat exchanger 29 and the air heat exchanger 17 to use all of the heat.

If inadequate heat is being supplied to heat the enclosed space, heat may be recovered from the heat storage area 31 by operation of the pump 37. To do this, the valve 65 is closed and the valve 67 is opened. Energizing pump 37 then causes flow into the remote heat storage area through the line 33a. It is imperative that the heating fluid be flowed in reverse through the remote heat storage area 31 in order to render the system operable. Specifically, the heated fluid after it has picked up heat in the remote heat storage area passes back through the line 33, air heating circuit 41 and pump 73 and air heat exchanger 17. The fluid having passed through the air heat exchanger 17 flows through the three way valve 77, conduit 41b into the suction side of the pump 37 for continued circulation.

If desired, the respective conditions may be sensed and the modes and options for operation controlled automatically. Ordinarily, circumstances are such that manual control can be employed satisfactorily without having to automate the system through temperature sensing devices and controls. For example, during the summer months, the pump 35 is employed to store heat in the heat storage area 31. Pumps 37 and three way valves 75 and 77 do not circulate the heating fluid through the enclosed space or in a reverse direction through the heat storage area. Thus the thermostat 91 energizes the pump 35 when the temperature at the solar collector 29 is great enough to warrant storing heat in the storage area. Typically, the thermostat 91 may be set to turn on at a temperature of about 80°-100° F. in order to store the heat and raise the temperature of the tons of sand in the trench and to a lesser extent the surrounding earth in the heat storage area to the range 70°-85° F.

In storing the "cold", or using the cooling fluid in the cooling mode in the enclosed space, the following operation is followed. When the temperature at the thermostat 93 is sufficiently low, automatic valve such as motor valve 95 is opened to allow flow through the heat exchanger 43 for venting heat to the cold atmospheric wind, such as the winter wind or the like. Of course, a suitable blower 97 can be employed to obtain optimal circulation past the heat exchanger 43. Frequently, the blower motor 97 and the pump motor of the pump 49 are connected with the thermostat 93 so as to be turned on when the ambient temperature is satisfactorily cool enough; for example, in the range of below about 45°-50° in order to take heat from the cold storage area 45 and vent it to the ambient. Specifically, the pump 49 circulates the cooling fluid through the cooling fluid circuit 47 and into the cold storage area 45. The cooling fluid may comprise an aqueous solution or other suitable heat transfer fluid. Typically, the antifreeze solution such as the aqueous solution containing ethylene glycol, diethylene glycol, or triethylene glycol, or methanol will be employed as the cooling fluid in the cooling fluid circuit. Ordinarily it is advisable to employ the same fluid in both the heating fluid circuit and the cooling fluid circuits such that minor amounts of the fluids can be intermingled without causing any problems, as by switching from the heating mode to the cooling mode in the enclosed space 21.

When the cooling mode is signalled, the three way valves 75, 77 opens to pass fluid from the air cooling circuit 53 to the pump 73 and the air heat exchanger 17. As can be seen, the air cooling circuit 53 may pass the fluid directly from the discharge side of the pump 49 where the high pressure cooling fluid can be circulated. Ordinarily, however, the pump 49 is being operated in the winter when the cooling mode will not ordinarily be signalled inside the enclosed space 21.

On the contrary, the pump 51 will ordinarily be turned on responsive to the thermostat 79 to circulate the cooling fluid in the opposite direction, inwardly through the conduit 47a and out through the conduit 47 to conduct heat into the cold storage area 45 and use the stored "cold" for cooling the enclosed space 21. Specifically, the valve 83 is closed and the valve 85 is opened to vent the fluid to the suction side of the pump 51 for operating in the cooling mode. Thus the cooling fluid passes through the air cooling circuit 53, through three way valve 75, pump 73 and air heat exchanger 17. The effluent cooling fluid from the air heat exchanger 17 passes through the three way valve 77 and the return conduit 53a and conduit 47b. The surge tank 87 operates as described hereinbefore to allow venting of noncondensibles. The heated cooling fluid is then passed through valve 85 to pump 51.

If desired, supplemental cooling means may be afforded by a mechanical air conditioning unit 99. As is understood, the air conditioning unit 99 includes a compressor 101 for compressing a refrigerant gas, a condenser 103 for condensing the refrigerant gas to a liquid, and an evaporator 105 for evaporating the liquid refrigerant. As illustrated, the evaporator 105 is a heat exchanger disposed in heat exchange relationship with the cooling fluid through the conduit 107. For example, if the temperature sensed by thermostat 109 is not low enough for adequate cooling, the pump 111 may be energized as well as the air conditioning unit 99 to supply chilled water. A valve 113 is operated, automatically or manually, to vent a portion of the return water through the conduit 107 and the evaporator 105 for chilling the water and obtaining the desired temperature for cooling the enclosed space 21. The pump 111 may be a smaller pump than the pumps 49 and 51.

If desired, during certain seasons of the year, the air conditioning unit 99 may be operated during off peak times to take advantage of economical electrical rates for storing "cold". In this embodiment, the pump 49 circulates the fluid into the cold storage area 45, back through the line 47a, valve 83, valve 113, conduit 107 and evaporator 105 for storing the "cold" by way of circulating the cooling fluid. As can be seen in FIG. 4, it is noticed that the temperature becomes coldest adjacent the entry to the cold storage area; for example, at the point where the conduit 47 enters the cold storage area; and the temperature increases toward a norm as the distance increases therefrom. Consequently, it is imperative that if the "cold" is to be used in the cooling mode efficiently, the cooling fluid must be flowed in a second direction opposite to the first direction in which it is flowed to store the cold.

It is of course, readily apparent that the respective conduits will be insulated where no heat exchange is desired and they are exposed to temperatures different from that of the fluid being circulated through the respective conduits in order to minimize heat exchange that would diminish the efficacy of the system.

From the foregoing it can be seen that this invention provides a useful improvement in an environmental system for using the relative temperatures of an ambient source to store the heat and/or cold for air conditioning an enclosed space, alone or in conjunction with a conventional system which can be designed much smaller because of the augmentation of the system of this invention.

Although the invention has been described with a certain degree of particularity, it is understood that the present disclosure is made only by way of example and that numerous changes in the details of construction and the combination and arrangement of parts may be resorted to without departing from the spirit and the scope of the invention, reference for the latter being had to the appended claims.

I claim:

1. In a system for conditioning air being circulated in an enclosed space, including:
   a. an air distribution system;
   b. an air circulation means for circulating the air through the air distribution system; said air circulation means being connected with said air circulation system; and
   c. a first air heat exchanger for exchanging heat with said air; said first air heat exchanger being disposed in said air distribution system;
   the improvement for heat exchanging with ambient sources and comprising:
   d. a second heating heat exchanger for extracting heat from an ambient heat source:
   e. an elongate remote heat storage area buried beneath the earth's surface and employing the earth as the storage medium;
   f. a heating fluid circuit for flowing a heating fluid through said second heat exchanger and said elongate remote heat storage area; said heating fluid circuit being connected with said second heat exchanger and said remote heat storage area with an inlet connection and an outlet connection; said outlet connection being spaced from said inlet connection such that reverse flow will extract stored heat from said remote heat storage area;
   g. heating fluid in said heating fluid circuit;
   h. first heating pump means for and connected into said heating fluid circuit so as to circulate said heating fluid through said heating fluid circuit, through said second heat exchanger and through said remote heat storage area in a first direction for storing heat in said heat storage area;
   i. second heating pump means for and connected into said heating fluid circuit so as to circulate said heating fluid through said heating fluid circuit and said heat storage area in a second direction opposite said first direction for removing heat from said heat storage area;
   j. air heating circuit means for and connected so as to flow said heating fluid through said first air heat exchanger in heat exchange relationship with said air for heating said air;
   k. a third cooling heat exchanger for venting heat to an ambient source for cooling a cooling fluid;
   l. an elongate remote cold storage area buried beneath the earth's surface and employing the earth as the storage medium;
   m. a cooling fluid circuit for flowing a cooling fluid through said third cooling heat exchanger and said cold storage area; said cooling fluid circuit being connected with said third heat exchanger and with said cold storage area with an inlet connection and an outlet connection; said outlet connection being spaced from said inlet connection such that reverse flow will deposit heat and effectively extract cooling capability from said remote cold storage area;
   n. cooling fluid in said cooling fluid circuit;
   o. third cooling pump means for and connected into said cooling fluid circuit so as to circulate said cooling fluid through said remote cold storage area in a first direction for storing cooling capacity by removing heat from said cold storage area;
   p. fourth cooling pump means for and connected into said cooling fluid circuit so as to circulate said cooling fluid through said cooling fluid circuit and said cold storage area in a second direction opposite said first direction for giving up heat to said cold storage area after heat is removed from said air;
   q. air cooling circuit means for and connected so as to flow said cooling fluid through said first air heat exchanger in heat exchange relationship with said air for cooling said air when operating in the cooling mode.

2. The system of claim 1 wherein said second heating heat exchanger is a solar collector for employing solar energy for heating said heating fluid.

3. The system of claim 1 wherein said heat storage area includes heat conductive conduit buried at a first depth below the surface of the earth and connected at respective ends with, respectively, said first and second heating pump means; said cold storage area includes heat conductive conduit buried at a second depth and connected at respective ends with said third and fourth cooling pump means.

4. The system of claim 3 wherein said respective heat conductive conduits in, respectively, said heat storage area and said cold storage area, each comprise a plurality of heat conductive conduits connected in parallel and contiguous a heat conductive plate.

5. The system of claim 4 wherein said plurality of conduits and contiguous plates in each of said heat storage area and cold storage area are formed of copper-containing metal and are buried in an elongate trench and contiguous wet sand that is, in turn covered by insulating backfill.

6. The system of claim 5 wherein said first and second depths are different and are more than six feet below the surface of the earth for insulation from ambient conditions at the surface.

7. The system of claim 6 wherein said first and second depths are about eight and sixteen feet respectively so as to provide separation vertically and said heat storage area and said cold storage area are also spaced apart horizontally.

8. The system of claim 1 wherein said third cooling heat exchanger includes an air-cooling fluid heat exchanger for chilling the cooling fluid during cold weather by flowing in heat exchange relationship with cold ambient air.

9. The system of claim 1 wherein a mechanical refrigerating unit is connected with the cooling fluid circuit and the cold storage area so as to remove heat from the remote cold storage area during the time of bargain electric rates and increase the storage capacity of the cold storage area for cooling the air conditioning air when operating in the cooling mode.

* * * * *